United States Patent [19]
Talbat et al.

[11] 3,828,918
[45] Aug. 13, 1974

[54] SLUG CONVEYOR FOR CONVEYING SLUGS OF ARTICLES AND RELEASING THE SLUGS OF ARTICLES FOR PACKAGING

[75] Inventors: Richard C. Talbat; Edward Rose, both of Skokie; Robert A. Roth, Chicago, all of Ill.

[73] Assignee: Peters Machinery Company, Chicago, Ill.

[22] Filed: Nov. 30, 1972

[21] Appl. No.: 311,005

Related U.S. Application Data

[62] Division of Ser. No. 173,473, Aug. 20, 1971, Pat. No. 3,719,020.

[52] U.S. Cl. ............................................. 198/155
[51] Int. Cl. ............................................. B65g 15/24
[58] Field of Search ....... 198/129, 155, 146; 53/159

[56] References Cited
UNITED STATES PATENTS
1,393,003  10/1921  Ayres ............................. 198/155 X Primary Examiner—Edward A. Sroka
Attorney, Agent, or Firm—Hill, Gross, Simpson, Van Santen, Steadman, Chiara & Simpson

[57] ABSTRACT

Endless chain type of slug conveyor for slugs of articles, such as cookies, in which the chain has upper and lower runs and flights in the form of drop gates are spaced along the chains in the space between the upper and lower runs. The flights are suspended from attachments pivotally carried by certain links of the chain and are biased by springs in slug carrying positions and are pivoted by cam and follower means in the slug release positions. The conveyor also includes side guides extending along the material carrying run of the conveyor which are adjustably moved toward and from each other in accordance with the number of slugs conveyed by the conveyor.

15 Claims, 13 Drawing Figures

3,828,918

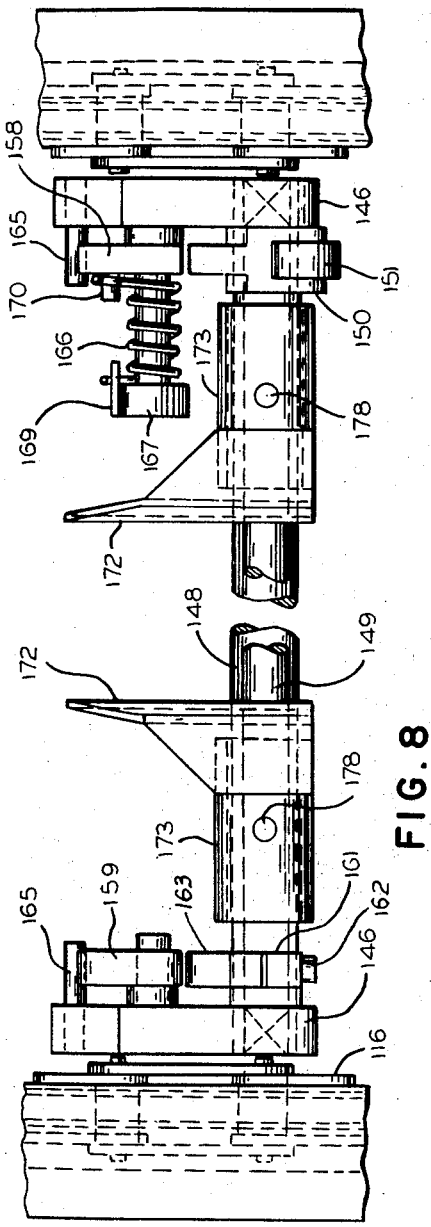
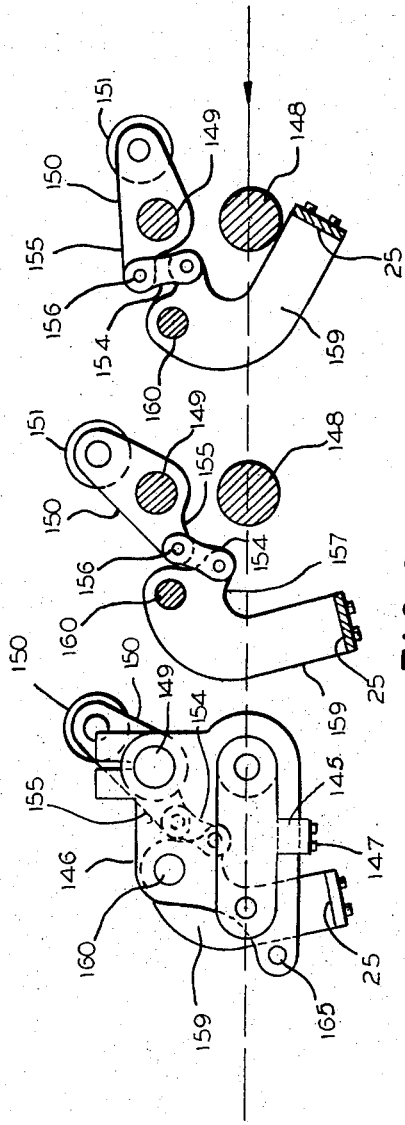

3,828,918

SLUG CONVEYOR FOR CONVEYING SLUGS OF ARTICLES AND RELEASING THE SLUGS OF ARTICLES FOR PACKAGING

This is a division of application Ser. No. 173,473, filed Aug. 20. 1971.

FIELD OF THE INVENTION

This invention relates generally to conveyors for carrying slugs of cookies to a series of bagging stations in which the flights of the coveyors are tiltable to discharge a predetermined number of slugs at selected bagging stations.

PRIOR ART

This invention is an extension of the developments of the tray loader of U.S. Pat. No. 3,290,859, dated Dec. 13, 1966 and the Richard C. Talbot application for patent for "Converger and Feeder for Cookies for Wrapping", Ser. No. 74,418, filed Sept. 22, 1970, which patent and application are assigned to the assignee of the present invention.

SUMMARY, ADVANTAGES AND OBJECTS OF THE INVENTION

Cookies are transferred from the sandwich machine and grouped in slugs of a preselected number of cookies in each slug, and delivered to a transfer conveyor transferring a plurality of slugs in side-by-side relation along drop gates disposed over a drop chute, converging the cookies for delivery to a slug conveyor, and depositing a slug of cookies between each pair of flights of the slug conveyor in a continuous operation. The transfer conveyor is driven in dwells and the drop gates of the slug conveyor open during each dwell and deposit the cookies into a drop chute which converges the groups of slugs and drops the slugs between the flights of the slug conveyor. The slug conveyor carries the slugs of cookies for deposite into from one to six bagging stations and delivers the cookies to the selected bagging stations through drop chutes, operable to drop the cookies into side-by-side troughs corresponding to the number of slugs delivered. A slug pusher operating in timed relation with respect to the dropping of cookies to the bagging station drop chute, pushes the cookies along converging troughs fitting into the mouths of bags extending along the troughs. The completion of pushing the cookies into the bag may be a manual operation, after which the bags may be heat-sealed by a machine separate from the bagging machine. The drop gates of the slug conveyor open to deliver the slugs to the bagging stations in staggered relation with respect to each other, to balance the load on the machine. As for example, where six bagging stations are in use, the slugs may be dropped into stations four, five, two, six, three and one or in any other preselected order.

The bagging stations are spaced along opposite sides of the slug conveyor and separate jack shafts are provided for the bagging stations at each side of the machine. Change speed gearing is provided in the drive to the jack shafts to drive the jack shafts at speeds corresponding to the groups of slugs to be bagged, and independent phase selector drives are provided between the jack shafts and the bagging stations, and drive individual cams and cranks at each station controlling dropping of the slugs of cookies from the slug conveyor, dropping the slugs of cookies from the drop chute into the bagging trough and the operation of pushing the cookies along the bagging trough into the bag. The timing of the dropping of cookies from the slug conveyor, the dropping of the cookies from the drop chute to the delivery trough, and the pushing of the cookies may be varied at each bagging station through the positioning of the cams by the phase selector drives in accordance with the number of groups of slugs to be bagged and the selected number of stations to be operated, to assure the continuous dropping of the cookies from the slug conveyor to the preselected bagging stations with no piling up or spilling of cookies, or gaps or interruptions in filling of the slug conveyor and the bagging of cookies at the preselected bagging stations.

An advantage of the present invention is that articles, such as cookies may be bagged in a more efficient and expeditious manner than formerly in any number of a series of bagging stations, delivering the articles for bagging in a preselected order.

Another advantage of the invention is that the drive to the slug conveyor, the drop gates for the slug conveyor and the drop gates dropping cookies to the bagging station are fixed to operate in timed relation with respect to each other, so the release of slugs from the slug conveyor will be at the proper timed intervals to fill the drop chutes and troughs at the bagging stations in a continuous operation during the entire bagging operation.

A further advantage of the invention is that individual controls controlling the dropping of slugs from the slug conveyor, the dropping of slugs from the drop chute into the bagging troughs and the pushing of cookies along the chutes into the bags at each bagging station are so operated as to enable the disconnection or connection of any bagging station at the selection of the operator of the machine.

Still another advantage of the invention is the provision of a phase selector drive mechanism at each bagging station, driven in accordance with the speed of travel of the slug conveyor, attaining the release of slugs from the slug conveyor and drop chutes to the bagging station at the proper timed intervals, which phase selector drive may vary the phases of the operating parts of the apparatus in accordance with the number of articles to be loaded, the number of stations in use and the speed of travel of the slug conveyor to keep the dropping and pushing operations in phase with travel of the slug conveyor in a simple operation by the operator of the machine.

A principal object of the invention, therefore, is to provide an improved form of slug conveyor for conveying slugs of articles for bagging at any one of a number of of preselected bagging stations, which is of a simple and improved form so arranged as to assure no interruption in the bagging or packaging of the articles.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure.

DESCRIPTION OF THE DRAWINGS

FIG. 6 is a fragmentary sectional view showing in detail a drop chute, receiving slugs of cookies from the slug conveyor, at a bagging station for dropping the slugs to a bagging chute.

FIG. 8 is a partial fragmentary plan view of the slug conveyor.

FIG. 9 is a diagrammatic view of the slug conveyor showing the positions of the supporting gates for cookies in closed positions and in open positions with certain parts removed.

MACHINE IN GENERAL AND TRANSFER TO SLUG CONVEYOR

Figure 1:
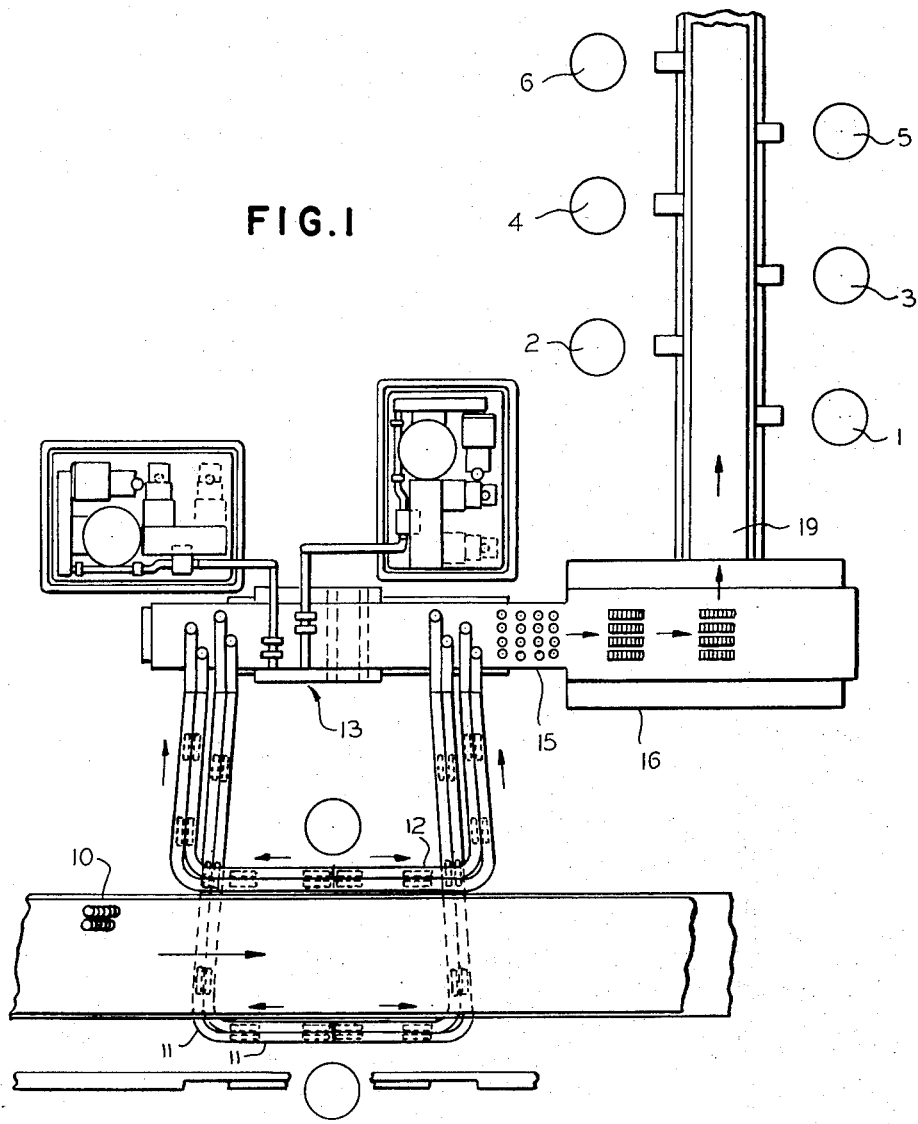
FIG. 1 is a diagrammatic plan view of a cookie bagging apparatus constructed in accordance with the principles of the present invention.

In FIG. 1 of the drawings, we have diagrammatically shown in plan, a conveyor 10 conveying cookies from a bake oven (not shown). The cookies are taken by hand from the conveyor 10 and transferred to side-by-side vibratory feeder troughs 11 on one side of the conveyor, and into the vibratory feeder troughs 12 on the opposite side of the conveyor 10, and fed to a sandwich machine 13 coating the cookies with cream and making the cookies into sandwiches in a manner similar to that shown and described in U.S. Pat. No. 2,936,557, so not herein shown or described further.

Figure 4:
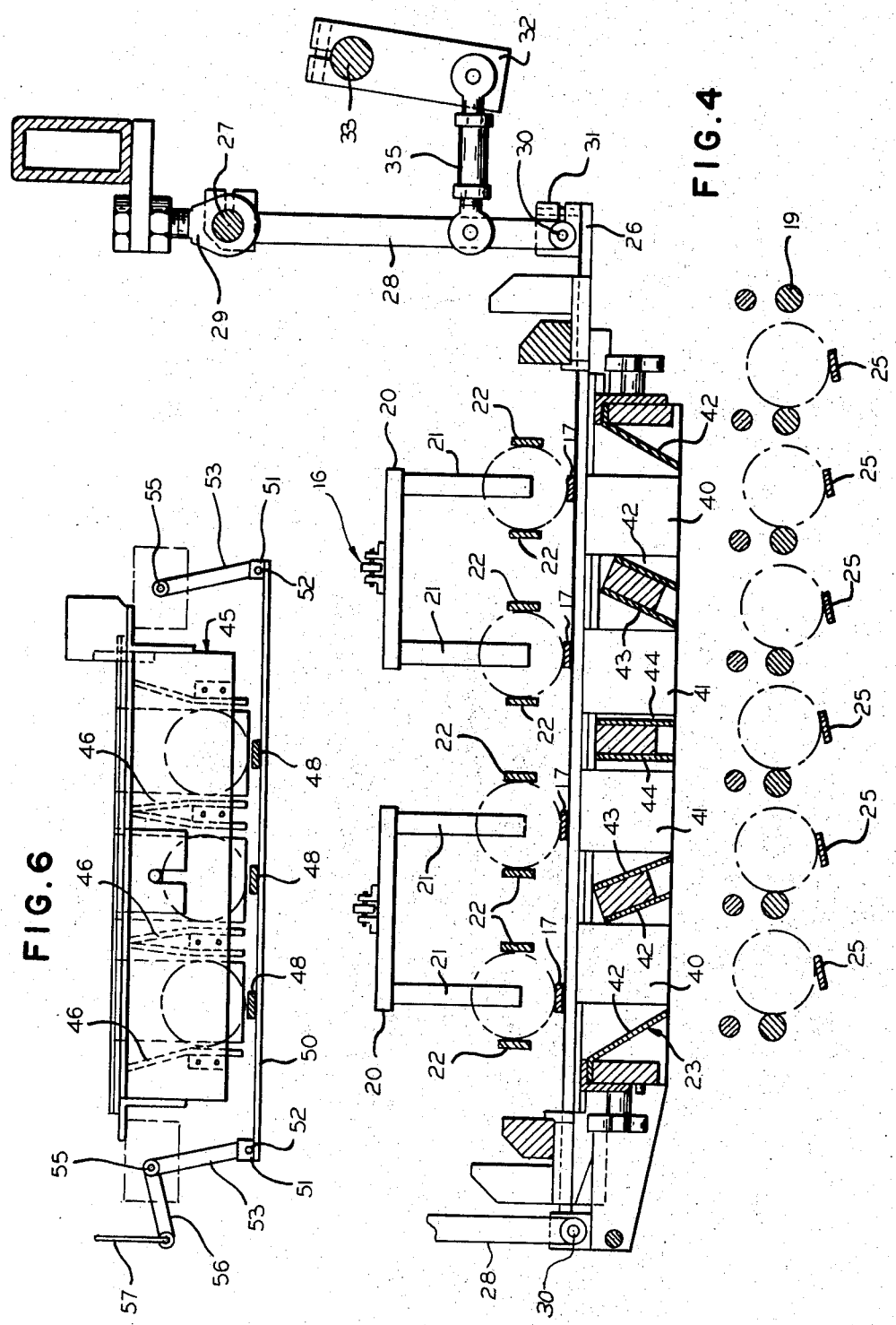
FIG. 4 is a fragmentary transverse sectional view taken along the transfer station shown in FIG. 3 with certain parts removed in order to illustrate the drop chute converging the slugs of cookies dropped from the transfer conveyor, and transferring the cookies to the flights of the slug conveyor.

From the sandwich machine, the sandwiched cookies are transferred in rows, herein shown as being in four rows, to a counting conveyor 15, separating the rows of cookies into slugs of a preselected number and delivering the slugs in side-by-side relation to a transfer conveyor 16. The transfer conveyor 16 transfers the cookies along drop gates 17 (FIG. 4), which are movable to release the slugs of cookies to the space between the flights of a slug conveyor 19, in timed relation with respect to travel of the slug conveyor, to fill the space between each flight of the slug conveyor upon traveling movement thereof. The counting conveyor, transfer conveyor and drop gates are shown and described in U.S. Pat. No. 3,290,859, so need not herein be shown or described, except insofar as the transfer conveyor and drop gates cooperate to continuously fill the flights of the slug conveyor as traveling from the discharge of the transfer conveyor, along and between a series of bagging stations one, three and five on one side of said slug conveyor and two, four and six on the opposite side of said slug conveyor.

Figure 3:
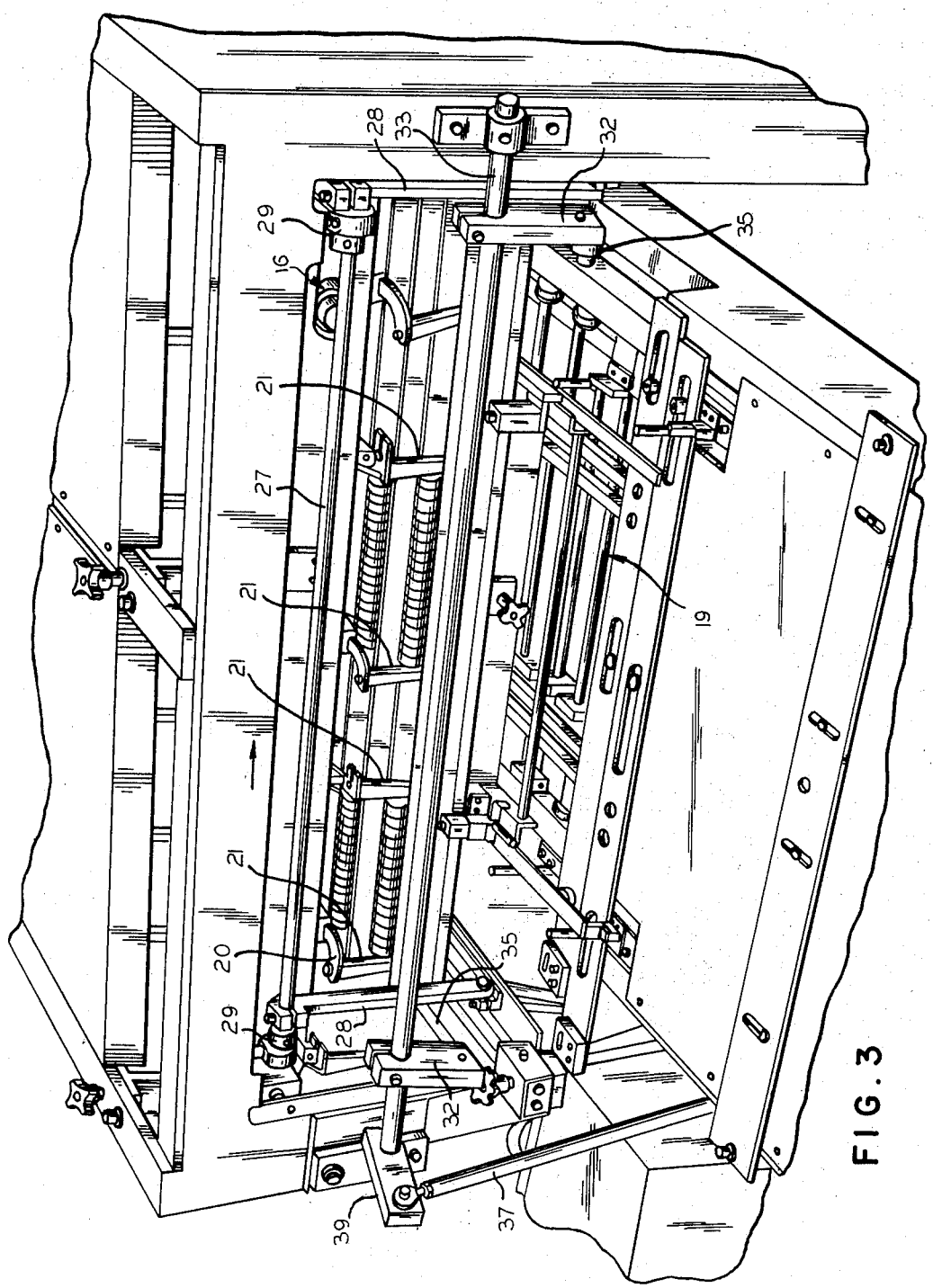
FIG. 3 is a fragmentary perspective view looking at the transfer station and showing the transfer conveyor in position to transfer and deposit cookies between the flights of the slug conveyor.

The transfer conveyor 16 is driven in dwells from the mechanism driving the counting conveyor 15, and cookies are discharged during each dwell of the transfer conveyor. Said transfer conveyor has attachments 20 spaced therealong (FIGS. 3 and 4) and secured to the chains (not shown) of said conveyor and depending therefrom when the conveyor is traveling along its conveying run. Each attachment 20 has laterally spaced flights 21 extending downwardly therefrom between side rails 22, for conveying slugs or rows of cookies between said side rails 22 and along the drop gates 17. The drop gates 17 are movable laterally relative to the side rails 22 to drop the slugs of cookies into a drop chute 23, converging the slugs of cookies from their lateral spacing on the transfer conveyor to the spacing between the flights of the slug conveyor 19, and guiding the slugs of cookies in the space between the flights of the slug conveyor to rest on drop gates 25, forming the material carrying flights of the slug conveyor.

The drop gates 17 are part of the laterally movable drop gate carriage 26 (FIG. 4), which is suspended from rock shafts 27 on pairs of parallel links 28. The rock shafts 27 are journalled in aligned bearing supports 29 secured to the main frame of the machine. The parallel links 28 have shafts 30 mounted on their lower ends and mounted at their opposite ends in upright brackets 31 on the carriage 26. As in the aforementioned application Ser. No. 74,418, filed by Richard C. Talbot for "Converger and Feeder for Cookies for Wrapping", now U.S. Pat. No. 3,627,102.

The drop gate carriage 26 is moved back and forth in timed relation with respect to travel of the transfer conveyor 16 to drop four slugs or rows of counted cookies into the drop chute 23, by rocking movement of a lever arm 32, secured to and depending from a rock shaft 33. The lever arm 32 has a link 35 pivotally connected to its lower end, at one end of said link and pivotally connected to the link 28, at the opposite end of said link, for moving the drop gates 17 out of supporting relation with respect to slugs of cookies upon rocking movement of said rock shaft.

The mechanism for actuating the drop gates in timed relation with respect to intermittent travel of the transfer conveyor 16 and continuous travel of the slug conveyor 19 to drop the slugs of cookies to the drop gates 25 for continuously supplying each flight of the slug conveyor 19 with a slug of cookies is by operation of a cam (not shown) driven in timed relation with respect to travel of the transfer conveyor 16 by the drive 18 through a suitable drive train, as shown and described in U.S. Pat. No. 3,290,859, so not herein shown or described in detail.

The chute 23 disposed beneath the transfer conveyor 16 has outer chutes 40 and inner chutes 41 disposed therebetween. The outer chutes 40 have parallel side walls 42 inclined to converge the slugs of coolies to the spacing between the flights of the slug conveyor. The inner chutes 41 have outer inclined side walls 43 extending parallel to the side walls 42 and inner side walls 44 midway between the side walls 43 and extending vertically. The side walls 42 converge the slugs of cookies inwardly toward each other, while the side walls 43 and 44 cooperate to converge the rows of cookies, and maintain the required spacing between the rows of cookies, as dropped in the spaces between the flights of the slug conveyor 19. As for example, the spacing between the slugs of cookies when traveling along the drop gates 17 is in the order of 4⅛ inches, while the spacing between the rows of cookies on the drop gates 25 of the slug conveyor is in the order of 3 inches.

BAGGING STATION DROP CHUTE

Figure 5:
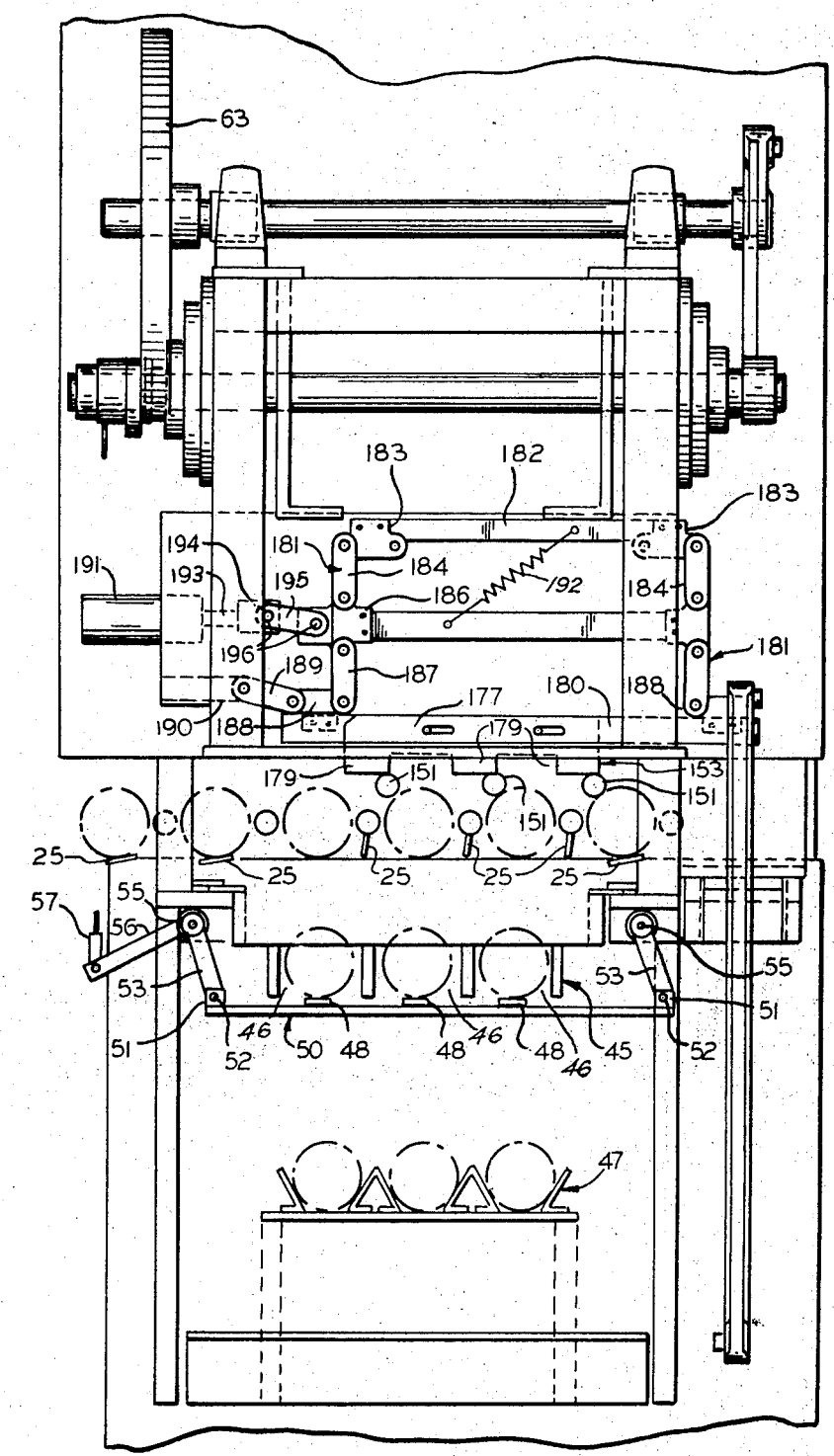
FIG. 5 is a fragmentary diagrammatic transverse sectional view taken through the apparatus at a bagging station, and showing the dropping of cookies from the slug conveyor to a drop chute at a bagging station with certain parts broken away and certain other parts shown in section.
Figure 7:
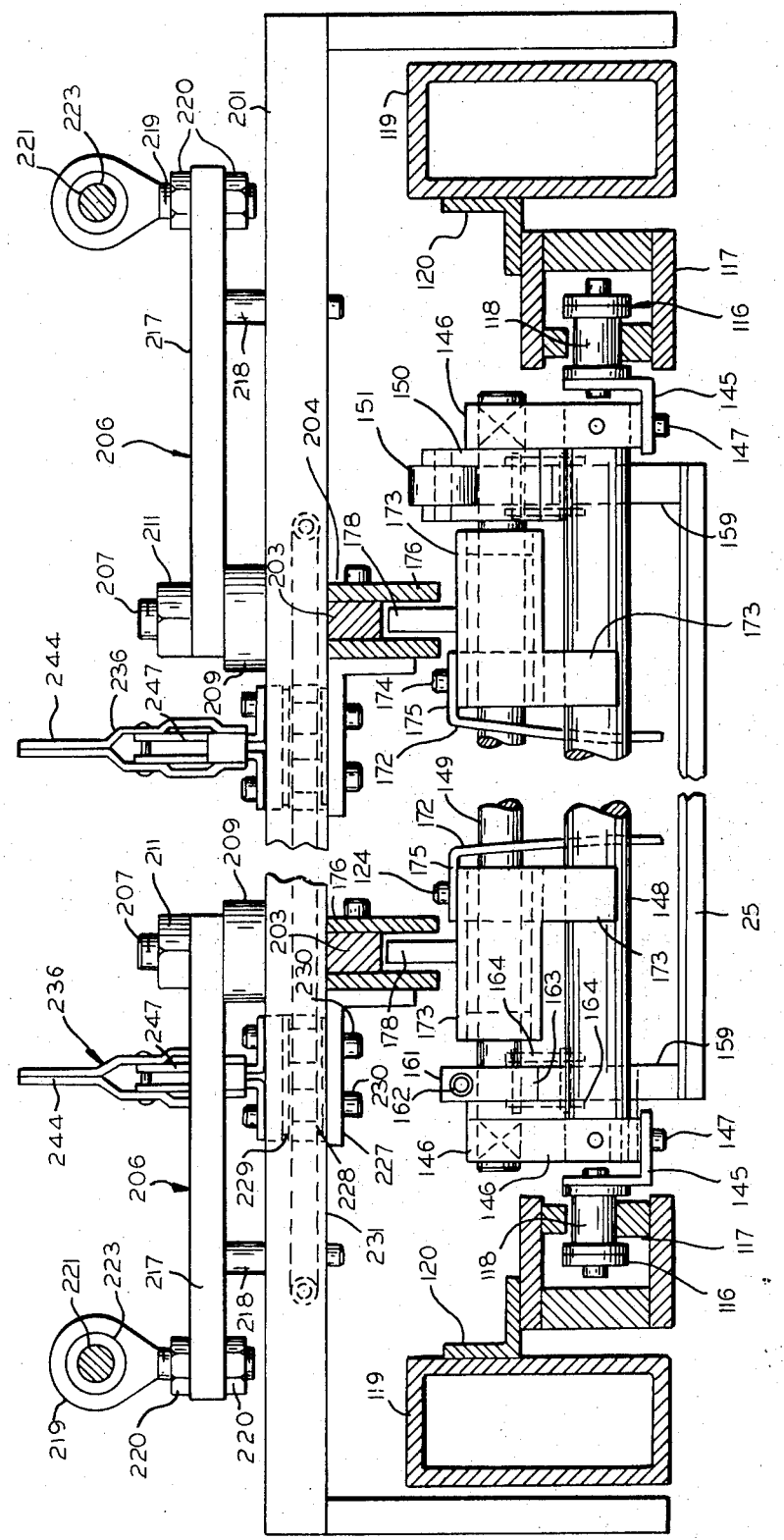
FIG. 7 is a fragmentary transverse sectional view taken through the slug conveyor.
Figure 10:
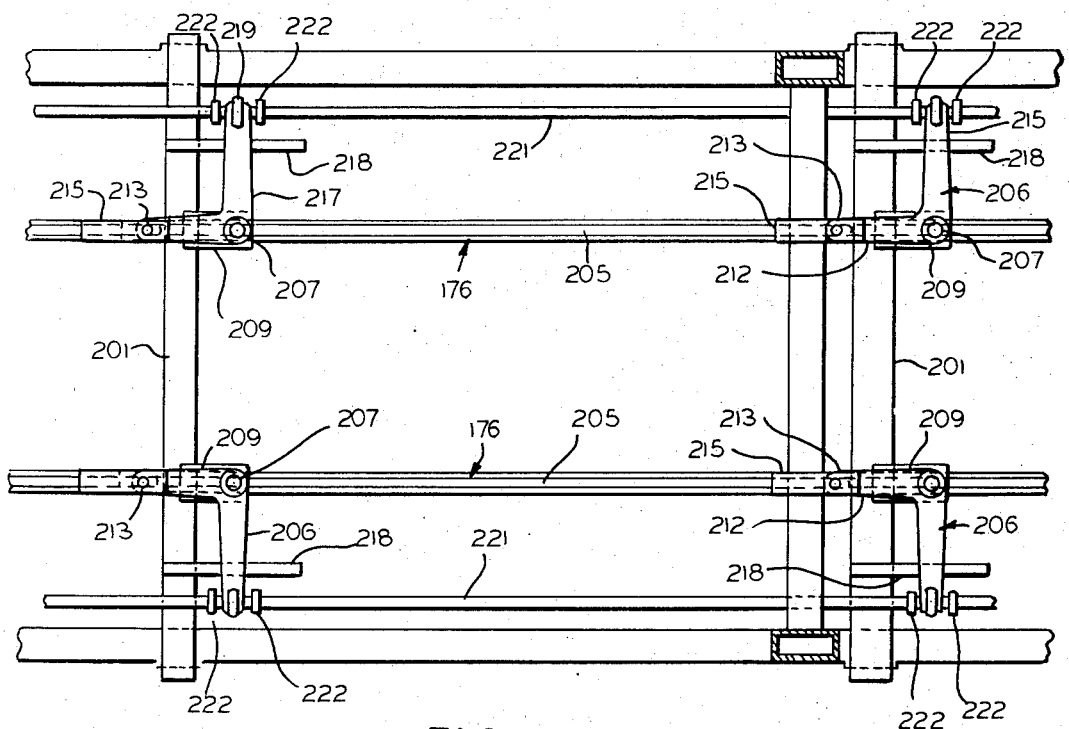
FIG. 10 is a fragmentary plan view with parts removed and other parts broken away and in section showing the adjustable guides for the sides of the slug conveyor, and the means for laterally adjusting the guides toward and from each other.

A drop chute 45 is provided at each bagging station in cookie receiving relation with respect to the slug conveyor 19 disposed thereabove (FIGS. 5 and 7). The drop chute 45 is herein shown as being provided with three pockets or chutes 46 although the number of chutes may be varied in accordance with the number of slugs to be dropped, the side walls of which converge from the upper ends toward the lower ends thereof, to receive slugs of cookies dropped from the slug conveyor 19, and momentarily hold the slugs of cookies for discharge onto a bagging chute 47 disposed therebeneath, and extending transversely of the path of travel of the slug conveyor 19, and parallel to the slugs of cookies thereon.

Drop gates 48 extend along the bottoms of the pockets 46 for supporting the rows of cookies as dropped into said pockets or chutes from the slug conveyor 19. The drop gates 48 are mounted on parallel spaced bars 50 having bearing bosses 51 extending upwardly of their outer ends forming supports for shafts 52. Parallel links 53 suspend the bars 50 and shafts 52 from parallel shafts 55 supported on the main frame of the machine and extending laterally thereof and are rocked by a crank arm 56 to move the drop gates 48 into and out of slug supporting positions in the manner shown and described in our parent application Ser. No. 173,473.

SLUG CONVEYOR

Figure 2:
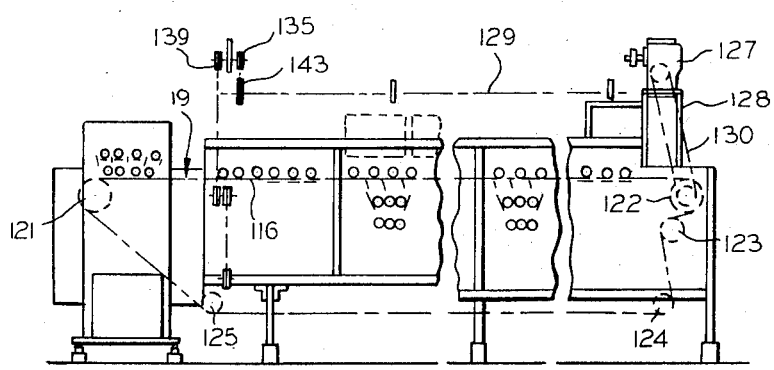
FIG. 2 is a diagrammatic view in side elevation of the bagging apparatus shown in FIG. 1.

The slug conveyor 19 is shown in FIGS. 7, 8 and 9 as being a chain type conveyor including a pair of laterally spaced endless chains 116 of the roller type, the upper runs of which are guided in gibbed guides 117 on rollers 118 of the chain (FIG. 7). The gibbed guides 117 extend along the main frame of the machine and are secured to opposite parallel side frame members 119 thereof, as by angle brackets 120. Said endless chains 116 are shown in FIG. 2 as extending from idler sprockets 121 at the inby end of the conveyor to the drive sprockets 122 at the outby end of the conveyor (FIG. 1). From the drive sprockets 122, the chains extend inwardly and downwardly partially about tension idlers 123. Said tension idlers may be adjustable to take up tension on the chains in a conventional manner. From thence, the conveyor chains extend downwardly about and under idler sprockets 124. The return runs of said endless chains then extend along the lower part of the main frame of the machine to and about idler sprockets 125 adjacent the inby end of the conveyor and angularly upwardly therefrom to the idler sprockets 121.

Figure 14:
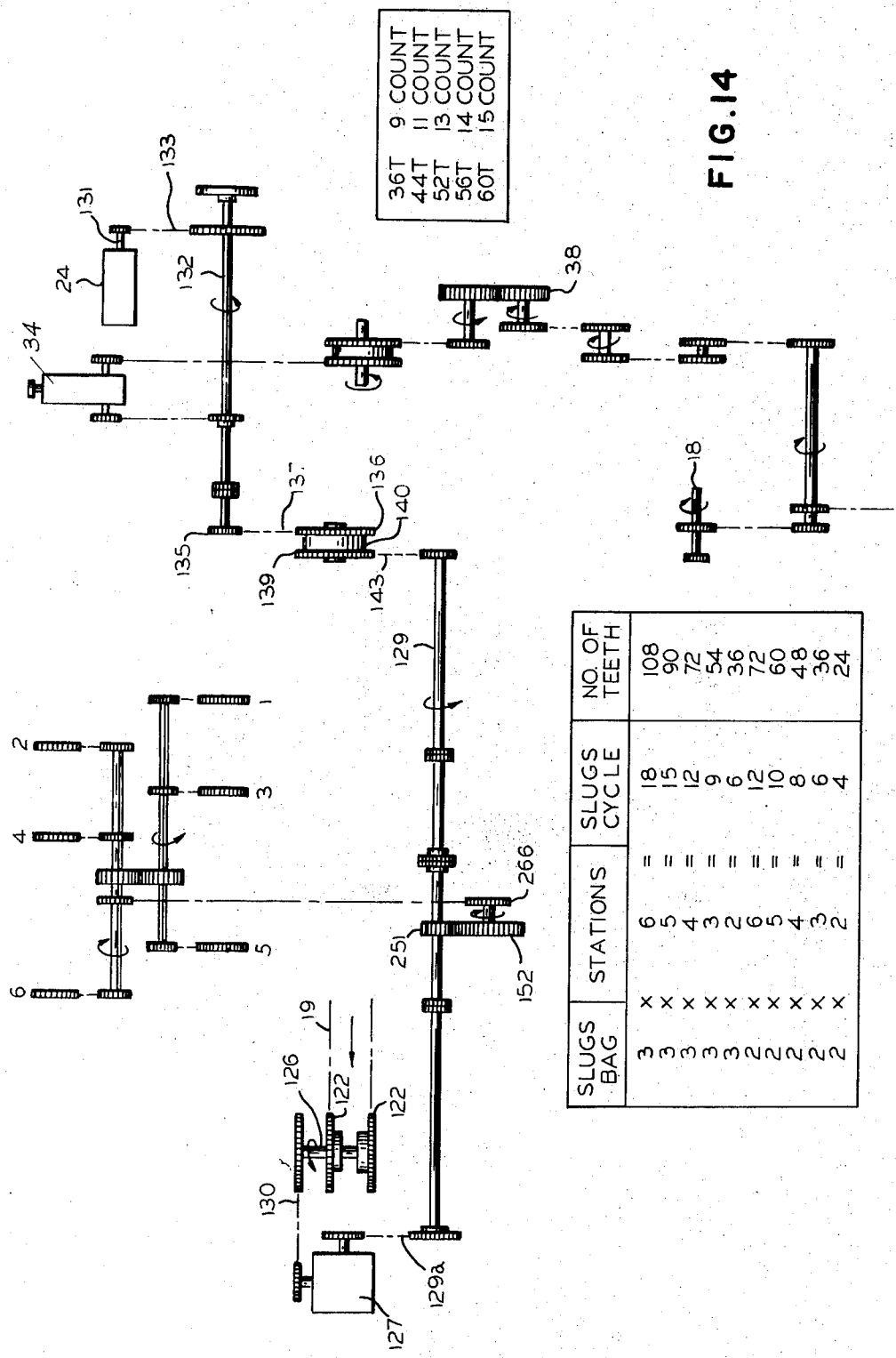

The drive sprockets 122 are keyed or otherwise secured to a drive shaft 126 extending transversely of the main frame of the machine. The drive shaft 126 is driven from a speed reducer 127 on a pedestal 128 mounted on the main frame of the machine and extending thereabove. The speed reducer 127 is driven from a line shaft 129 through a chain and sprocket drive 129a and drives the shaft 126 through a chain and sprocket drive 130. The line shaft 129 is in turn driven from the motor 24, which has a motor shaft 131 driving a parallel shaft 132 through a timer belt drive 133. The shaft 132 has a sprocket 135 on its end opposite the timer belt drive, having driving connection with the sprocket 136 through a drive chain 137. The sprocket 136 drives a coaxial sprocket 139 through a safety disconnect drive 140. Said safety disconnect drive 140 is diagrammatically shown in block form in FIG. 14 and may be a ball-type of safety disconnect drive in which balls move out of sockets upon overload conditions, against the bias of springs, in a manner well known to those skilled in the art, so not herein shown or described further. The safety disconnect drive need not necessarily be a ball-type of disconnect drive, but may be of any suitable form, well known to those skilled in the art. The sprocket 139 in turn has drive connection with the line shaft 129 through a chain and sprocket drive 143.

Inside links 144 of the slug conveyor chain 116 have attachments 145 extending horizontally inwardly therefrom, forming supports for drop gate carrier blocks 146, spaced along said chain. Machine screws 147 are provided to secure said drop gate carrier blocks to extend upwardly from the attachments 145 (FIG. 7).

The drop gate carrier blocks 146 are laterally spaced apart by a transverse shaft 148, mounted at their opposite ends on said carrier blocks adjacent the lower end portions thereof and engaged by the slugs of cookies resting on the drop gates 25. The shaft 148 may be pinned or otherwise secured to said drop gate carrier blocks. Spaced above the shaft 148 is a pivot shaft 149 rotatably journalled in said carrier blocks at its opposite ends and forming a mounting for an operating lever 150 having a follower roller 151 on the free end thereof. Said follower roller is engageable with a castellated cam 153 to effect pivotal movement of the lever 150 and opening of the associated drop gate. The lever 150 may be pinned or otherwise secured to the shaft 149. A pair of links 154 is pivoted to an arm 155 of the lever 150 on a transverse pivot pin 156 (FIG. 9). The opposite ends of the links 154 are pivoted to opposite sides of a lever arm 157 extending from a drop gate carrier 159. The drop gate carrier 159 is pivoted to the inside of the drop gate carrier block 146 on a transverse pivot shaft 160. Each drop gate carrier is in the form of a depending lever arm, forming a support for an end of a drop gate 25, which may be secured to the bottom thereof as by machine screws, or any other suitable securing means.

On the opposite side of the conveyor from the follower roller 151 is a drop gate operator 161. Said drop gate operator 161 is of a split construction and is secured to the shaft 149 by a machine screw 162, to be pivoted by the shaft upon pivotal movement of the lever 150. The drop gate operator 161 has a lever arm 163, depending therefrom when the associated drop gate 25 is in a cookie-supporting position. The lever arm 163 is pivotally connected to an associated drop gate carrier 159 by a pair of links 164 extending along opposite sides of said operator and said drop gate carrier and pivotally connected to said operator and carrier in the same manner the operator lever 150 is connected to its associated drop gate carrier. Stop pins 165 extend inwardly of each drop gate carrier block 146, adjacent the lower end portions thereof and form stops for the drop gate carriers 159 and drop gates 25 in the slug supporting positions thereof (FIGS. 7, 8 and 9).

Figure 12:
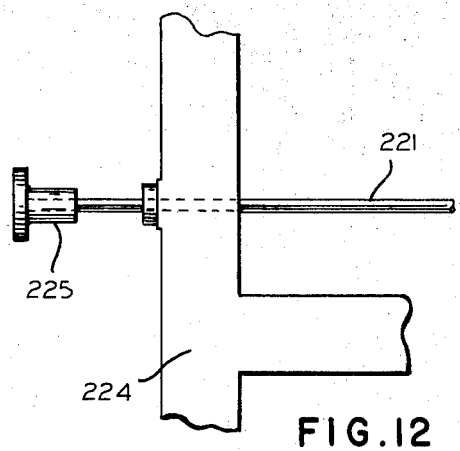
FIG. 12 is a fragmentary detail view in side elevation showing the actuating means for the side guide positioners.

The drop gate carriers 159 are biased into engagement with the stops 165 by a torsion spring 166 (FIG. 8) encircling a pin 167 mounted on and extending from a drop gate carrier block 146. One end of the spring 166 engages a pin 169 welded or otherwise secured to a collar on the pin 167 and extending inwardly therefrom. The other end of the spring 166 engages a pin 170 projecting outwardly of the drop gate carrier 159, shown in FIG. 12 as being a right-hand drop gate carrier. The spring 166 thus maintains the drop gate carriers 159 and drop gate 25 in the slug supporting positions in engagement with the stop pins 165 as shown in FIG. 8 and returns the drop gates and carriers in their slug supporting positions, after having been moved to the open position shown in the right-hand side of FIG. 9, by engagement of the follower rollers 151 with the castellated cam 153 (FIG. 5).

SIDE GUIDES — SLUG CONVEYOR

The rock shaft 149 forms a mounting for side guides 172 adjustably mounted on said rock shaft for movement toward and from each other in accordance with the number of cookies in the slugs delivered from the transfer conveyor 16, to the slug conveyor 19. As shown in FIGS. 7 and 8, the side guides 172 are mounted on individual carrier members or blocks 173, mounted on the shaft 149 for movement therealong. The mountings for the side guides on said carrier members include machine screws 174 extending through outwardly extending horizontal legs 175 of said side guides and threaded in the top surfaces of said carrier members 173. The side guides flare inwardly of the horizontal legs thereof, to form a hopper-like effect, and guide the slugs of cookies for discharge along said side guides onto the associated drop gates 25.

Each carrier member 173 has a pin 178 extending upwardly therefrom, into a downwardly opening slot extending along a side guide positioner 176. The side guide positioners are adjustably movable toward and from each other at the selection of the operator of the machine, in a manner which will hereinafter more clearly appear as this specification proceeds. The side guides 172 are cut away to accommodate movement of said side guides along the shafts 148 and 149.

CAM MEANS OPERATING SLUG CONVEYOR DROP GATES

Figure 13:
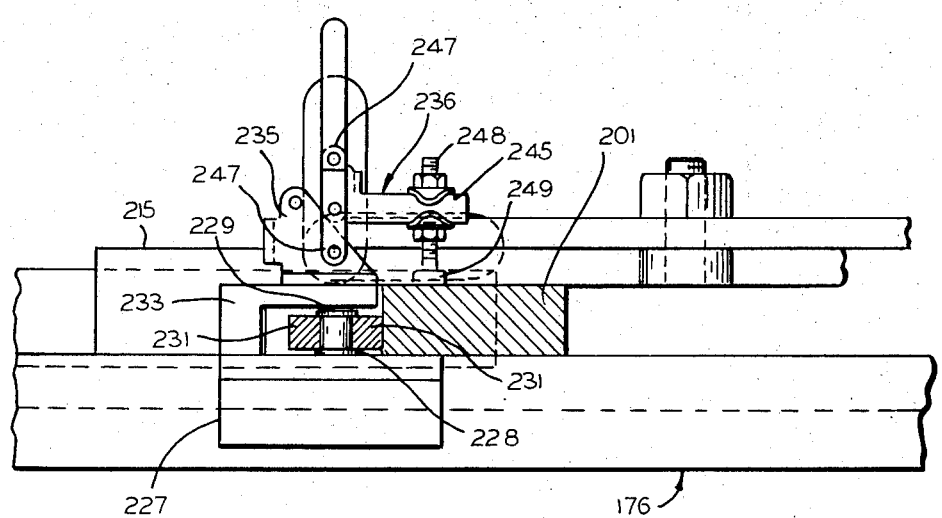
FIG. 13 is a fragmentary view in side elevation with certain parts in section, and showing the toggle lock for locking the positioner and side guides for the slug conveyor in position.

Referring now in particular to the castellated cam 153 for operating the drop gate carriers 159 and moving the drop gates 25 into slug release positions, a castellated cam 153 is provided for each bagging station. Said cams are operated independently of each other in proper phase relation with respect to travel of the slug conveyor, and dropping of the cookies by operation of the castellated cam 153 into position to engage the follower rollers 151 and move the drop gates 25 into their slug dropping positions, as shown in FIGS. 5 and 13.

A castellated cam 153 is provided at each bagging station and the mechanism for moving said cams into their operative positions is the same for each station so only one cam and operating mechanism therefor need herein be shown and described. As shown in FIG. 5, the cam 153 is in the form of a cam bar 177 extending longitudinally of the direction of travel of the slug conveyor, and having three lobes 179, where three slugs are to be bagged, and shown as being rectangular in side elevation and spaced apart in accordance with the spacings of the follower rollers 151 on the levers 150. A cam bar having two lobes may be substituted, where two slugs are to be bagged. The cam bar 177 extends along and depends from a carrier bar 180 and may be adjustably secured thereto, as by machine screws or a like securing means. The carrier bar 180 is raised and lowered to bring the lobes 179 into and out of their operative positions by a toggle linkage connection 181.

The toggle linkage connection 181 includes a mounting bar 182 suitably secured to the main frame of the machine and stationary relative to the bar 180 and parallel thereto. The mounting bar 182 forms a mounting for spaced pivot brackets 183. Parallel links 184 are pivoted to and depend from the pivot brackets 183 and form a suspension means for an actuating bar 185, and are provided thereto on brackets 186 at opposite ends of said bar. Parallel links 187 are pivoted to the brackets 186 and depend therefrom. Said links are pivoted at their lower ends to mounting brackets 188, mounted on the mounting bar 180, adjacent opposite ends thereof and extending upwardly therefrom.

Restraint of horizontal movement of the cam bar 177 and castellated cam 153 to effect vertical movement of the cam 153, is attained by a restraining link 189, pivoted to a bracket 188 at one end and pivoted at its opposite end to a mounting bracket 190 mounted on the inside of a mounting plate for an actuating cylinder 191. A tension spring 192 connected between the actuating bar 185 and the mounting bar 182, returns the cam 153 into its elevated retracted position free from the rollers 151.

The cylinder 191 is a fluid pressure operated cylinder and may be an air cylinder. A piston (not shown) in said cylinder has a piston rod 193 extending therefrom. A coupler attachment 194 on the end of the piston rod 193 forms a connector for a link 195 on a pivot pin 196. The opposite end of the link 195 is pivoted to the adjacent bar 185, as by a similar pivot pin 196.

The supply of fluid under pressure to the rod end of the cylinder 191 will thus retract the piston rod 193 and vertically move the mounting bar 180 and castellated cam 153 into the operative position shown in FIG. 5, and position the lobes 179 of the cam 153 into position to engage the follower rollers 151 and effect movement of the operating levers 150 in clockwise directions and movement of the drop gate carriers 159 and drop gates 25 in counterclockwise directions, through the linkage connections 154, into the slug release position shown in FIG. 5.

ADJUSTMENT MEANS FOR SIDE GUIDES

Referring now to FIGS. 7, 8 and 10 to 13, the side guides 172 are adjustably moved toward and from each other by a lateral movement of the side guide positioners 176 slidably supported for movement along the undersides of transverse bars 201. The positioners 176 include a spacer bar 203 and side plates 204 extending along each side of said bar and depend therefrom to form the downwardly opening guide or positioning slot for the pin 178.

Figure 11:
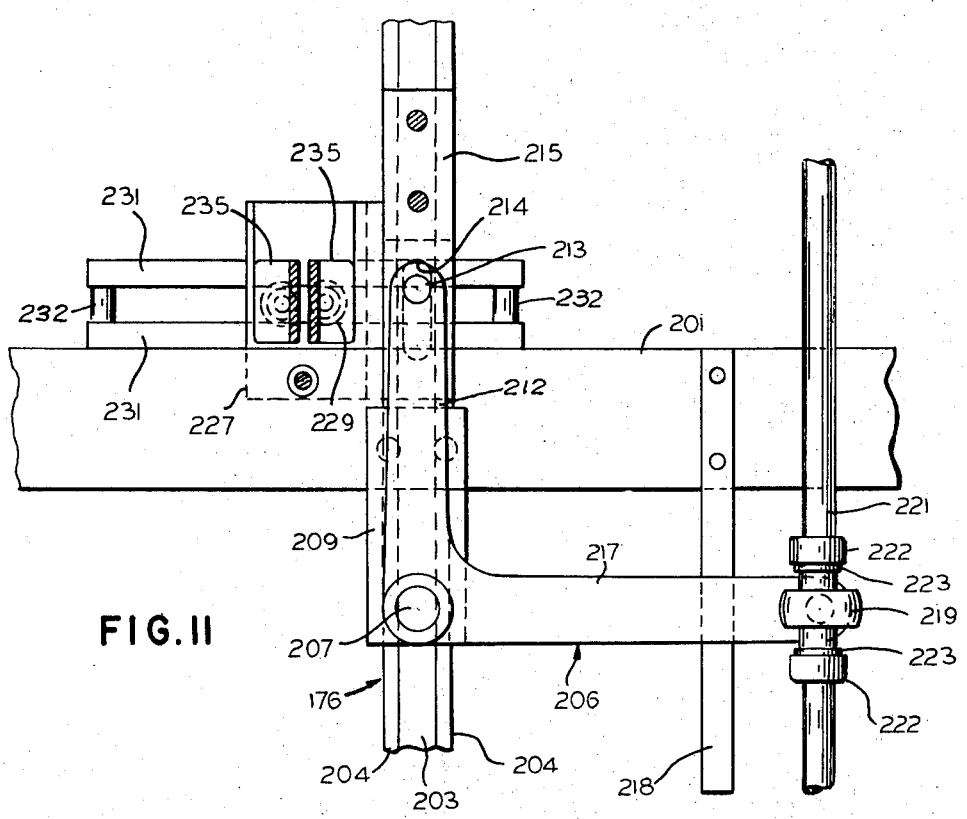
FIG. 11 is an enlarged detail top plan view illustrating the adjusting means for the side guide positioner for the side guides of the slug conveyor.

The adjustment means for moving the side guide positioners 176 toward and from each other comprise a series of bell cranks 206, pivotally supported on the transverse bars 201. As shown in FIG. 11, the bell cranks 206 are pivoted intermediate their lever arms on vertical pivot pins 207, the vertical axes of which intersect the longitudinal axis of the associated positioning guide 176. The pivot pin 207 is mounted on a support 209 extending perpendicularly of the associated bar 201 and welded or otherwise secured to the top surface thereof. A collar 211 clamped on the vertical pivot pin 207, is shown in FIG. 7 as retaining the bell crank to said pivot pin for pivotal movement about the axis thereof.

The bell crank 206 has a lever arm 212 extending from the pivot pin 207 above and generally in alignment with an associated guide positioner 176. The lever arm 212 has a pivot pin 213 mounted on the end thereof and depending therefrom within a slot 214 in a positioner plate 215 extending along the side guide positioner 176 and suitably secured thereto, to move the guide positioner laterally upon pivotal movement of said bell crank about the axis of the pivot pin 207. The positioner plate 215 has a portion lapping the bar 201 and forming a slidable support for said side guide positioner thereon. The bell crank 206 has a lever arm 217 extending laterally outwardly therefrom and shown in FIG. 11 as extending generally at right angles with respect to the lever arm 212. The lever arm 217 slidably rests upon a support bar 218 extending from the top of the bar 201 perpendicularly thereto. The lever arm 217 has a screw eye 219 mounted thereon and extending upwardly therefrom and secured to the end of said lever arm 217 as by nuts 220 threaded on said screw eye and abutting opposite sides of the lever arm 217. The nuts 220 may accommodate pivotal movement of said screw eye about the axis of the screw.

An adjustment link 221 in the form of a rod extends through the eyes of the screw eyes to simultaneously pivot the bell crank 206 on one side of the machine upon rectilinear movement of said link. Collars 222 are clamped on said link 221 on opposite sides of the screw eye and have spacers 223 on the insides thereof spacing said collars from said screw eye and abutting said screw eye when actuating the respective bell crank 206. The rods 221 are slidably guided at their outer ends beyond the drive end of the conveyor in vertically extending frame members 224 of the conveyor frame and have knobs 225 on their outer ends, to accommodate the rods or links to be rectilinearly moved by hand and adjustably move the side guide positioners 176 toward and from each other, and position the side guides 172 in accordance with the number of cookies in a slug.

The means retaining the side guide positioners 176 from axial movement along the conveyor is shown in FIG. 7 as being in the form of a series of angles 227 suitably secured to the side plates 204 on their vertical legs and abutting the undersides of the transverse bars 201 along their horizontal legs and extending to one side of said bars in the direction of the positioner plate 215, and extending along one side of said plate.

It will be noted from FIG. 7, that one angle extends inwardly of the right-hand side guide positioner while the aligned opposite angle extends outwardly of the left-hand side guide positioner. The construction of the support means for the side guide positioners otherwise is the same for each side of the slug conveyor.

The portion of the horizontal leg of the angle 227 extending to one side of the transverse bar 201 has a lower strap 228 of a roller chain link 229 secured thereto, as by machine screws 230. The straps of the chain link extend along the tops and bottom of two spaced bars 231 connected together at their opposite ends by end connectors 232. The rollers of the chain link extend between and engage the inner sides of the spaced bars 231 and guide the angle 227 and hold said angle and the side guide positioners 176 from axial movement relative to the main frame of the machine. The inner bar of the spaced bars 231 is suitably secured to the cross frame member 201 to extend to one side thereof, as shown in FIG. 11.

Secured to the top surface of the horizontal leg of the angle 227 and extending partially along the spaced bars 231 is an inverted L-shaped member 233 abutting the top surface of the horizontal leg of said angle 227 along one leg and positioning its horizontal leg to extend over the roller chain link 229, and form a mounting for mounting brackets 235 for an off-center toggle clamp 236.

The toggle clamp 236 may be of a conventional form operated by a hand lever 244 and having a clamping arm 245 pivoted to the bracket 235 at one end and having a pair of toggle links 247 pivoted thereto at the points of connection of said links together. One toggle link extends upwardly of the pivot to the clamping arm 245 and is shown as being pivoted to the lever 244, while the opposite toggle link depends from the pivot and is pivoted to the bracket 235 coaxial with the pivot of the lever. The clamping arm 245 extends over the transverse bar 201 and has a machine screw 248 threaded therein and extending therethrough. The lower end of the machine screw 248 has a pressure pad 249 thereon, moved into clamping engagement with a bar 201 as the toggle lever 244 is in its upright position shown in FIG. 13. The clamping pad 249 is released to accommodate free lateral adjustable movement of the side guide positioners as the lever 244 is turned in a counterclockwise direction to break the over-center relation of the links of the toggle linkage connection.

The two side guide positioners may thus be laterally adjusted by movement of the links 221 effected by operation of the hand knobs 225 to position the side guides 176 in the proper spacing to accommodate a slug of cookies to be dropped therebetween and to hold the slug of cookies in an upright position on the respective drop gate 25 during travel of the slug conveyor from its inby to its outby end.

It should be understood that while cookies and bagging stations are referred to herein, that the apparatus may be used for loading and packaging a wide variety of articles which are supplied in groups or slugs, and that the bagging stations may be various types of packaging stations in which the groups of slugs may be supplied for packaging by mechanized packing machines.

We claim as our invention:

1. A slug conveyor particularly adapted to convey slugs of articles and to drop the slugs of articles for packaging, comprising
   a pair of laterally spaced endless chains,
   means guiding said endless chains along a generally horizontal material carrying run;
   means driving said chains,
   said chains each including a plurality of links pivotally connected together,
   drop gates spaced along said chains in the space therebetween,
   drop gate supports pivotally connected to certain aligned links of said chains,
   actuator means for said drop gate supports pivotally connected to the links of said chains having said drop gate supports pivotally carried thereby and movable about axes parallel to the pivotal axes of said drop gate supports,
   a drop gate extending across each pair of aligned drop gate supports,
   operative connections between said actuator means and said drop gate supports,
   follower means associated with each actuator means,
   at least one of said actuator means moving said drop gate support to move the drop gate carried thereby into a slug release position, and
   cam means movable toward and from said follower means to engage certain of said follower means and actuate selected of said actuator means to pivot said drop gate supports and the drop gates carried thereby into their slug release positions.

2. The slug conveyor of claim 1, including stop means on certain links of said chains limiting movement of said drop gates into their slug supporting positions and spring means biasing said drop gate supports into engagement with said stop means.

3. The slug conveyor of claim 1,
   wherein the follower means includes a follower roller on each actuator means, and
   wherein the cam means is movable toward and from said conveyor into position to engage said follower rollers and move a series of said drop gates into their slug release positions.

4. The slug conveyor of claim 3,
   wherein the cam means is a castellated cam having a series of spaced lobes spaced in accordance with the spacing of said follower rollers for simultaneously engaging individual follower rollers and move a number of drop gate actuator means corresponding to said lobes to actuate the drop gates into their article release positions upon movement of said cam means toward said follower rollers.

5. The slug conveyor of claim 4,
   wherein a toggle linkage connection supports said castellated cam for movement up and down toward and from said follower rollers, and
   wherein fluid pressure cylinder and piston means are provided to move said cam up and down in accordance with the discharge of slugs of articles selected.

6. The apparatus of claim 2 including transverse actuator shafts extending across said links and pivotally carried thereby and forming pivotal mountings for said actuator means, side guides mounted on said actuator shafts and extending downwardly therefrom toward said drop gates, and means common to all of said side guides on the material carrying run of the conveyor for adjustably moving said side guides toward and from each other in accordance with the number of articles in the slugs conveyed by said conveyor.

7. The apparatus of claim 6,
   wherein the means common to all of said side guides for adjustably moving said side guides toward and from each other in accordance with the number of articles in the slugs conveyed by said conveyor, comprise guide members forming supports for said side guides and movable along said actuator shaft, pins extending upwardly of said guide members, side guide positioners extending along said conveyor in parallel spaced relation with respect to each other and having downwardly opening slots engaging said pins, and means moving said side guide positioners laterally and retaining said side guide positioners in position to move said side guides inwardly and outwardly equal distances to conform with the number of articles in the slugs conveyed.

8. In a slug conveyor for conveying slugs of articles and releasing the slugs at preselected stations,
   a pair of laterally spaced endless chains,
   said chains each including a plurality of links pivotally connected together,
   means guiding said endless chains along the material carrying run,
   means driving said chains,
   certain of said links of said chains having attachments extending inwardly therefrom,
   support blocks mounted on said attachments to extend parallel to said links,
   a separate shaft connected between each two aligned support blocks,
   a parallel shaft rotatably mounted between each two aligned support blocks,
   drop gate supports pivotally mounted on said support blocks for movement about axes parallel to the axis of rotation of said parallel shaft,
   a drop gate extending across each pair of aligned drop gate supports,
   actuator means on said parallel shaft,
   linkage connections between said actuator means and said drop gate supports,
   at least one of said actuator means pivotally moving said parallel shaft and said other actuator means adjacent the opposite end of said parallel shaft, and
   a follower roller on said at least one actuator means cooperable with cam means to pivot said actuator means to move said drop gate supports and the drop gates extending thereacross into slug release positions.

9. The slug conveyor of claim 8, including stop means limiting movement of said drop gates in their slug supporting positions and spring means biasing said drop gate supports into engagement with said stop means, and said actuator means and follower rollers in position to move said drop gates into their slug release positions.

10. The slug conveyor of claim 9, including cam means movable toward and from said conveyor in position to engage a plurality of follower rollers and move said drop gates into their slug release positions.

11. The slug conveyor of claim 10, wherein the cam means comprise a castellated cam, and cylinder and piston means are provided to move said castellated cam to simultaneously actuate a series of follower rollers and move the drop gates operated thereby into slug release positions.

12. The apparatus of claim 10, including side guides slidably mounted on said actuator shaft and extending downwardly therefrom toward said drop gates to retain slugs of articles thereto when in their slug carrying positions, and means common to all of said side guides when traveling along the material carrying run of the conveyor for adjustably moving said side guides toward and from each other in accordance with the number of articles in the slugs conveyed by said conveyor.

13. The slug conveyor of claim 9, including a pair of carrier members slidably mounted on said rotatable parallel shaft for movement toward and from each other and having slidable engagement with said separate shaft and held from rotational movement thereby, a side guide member carried by each carrier member and extending downwardly along the facing sides thereof toward the associated drop gate and forming retainer walls therefor, side guide positioners extending along said slug conveyor above said carrier members, means mounting said positioners for movement toward and from each other, slidable interengaging connections between said carrier members and said side guide positioners, and means moving said side guide positioners laterally for adjustably moving said side guides toward and from each other in accordance with the number of articles in the slugs on said drop gates.

14. The slug conveyor of claim 13,
wherein the means for moving the side guide positioners laterally comprise bell cranks pivoted intermediate their ends and having one of their lever arms pivotally and slidably connected with an associated side guide positioner and means operatively connected with the other lever arms of said bell cranks for moving said bell cranks together to move said opposite side guide positioners toward and from each other in a plurality of parallel planes.

15. The apparatus of claim 14,
wherein the side guide positioners have downwardly opening slots opening toward said carrier members,
wherein said carrier members have pins projecting into said slots for slidable movement therealong, and
wherein other means are provided for locking said side guide positioners in position relative to said conveyor.

* * * * *